(12) United States Patent
Mori

(10) Patent No.: US 7,664,783 B2
(45) Date of Patent: Feb. 16, 2010

(54) FILE MANAGEMENT PROGRAM, DATA STRUCTURE, AND FILE MANAGEMENT DEVICE

(75) Inventor: Masashi Mori, Fukuoka (JP)

(73) Assignee: Seiko Epson Corporation (JP)

( * ) Notice: Subject to any disclaimer, the term of this patent is extended or adjusted under 35 U.S.C. 154(b) by 512 days.

(21) Appl. No.: 11/230,254

(22) Filed: Sep. 19, 2005

(65) Prior Publication Data

US 2006/0074945 A1      Apr. 6, 2006

(30) Foreign Application Priority Data

Sep. 22, 2004   (JP)   ............................. 2004-274615

(51) Int. Cl.
  *G06F 17/30*   (2006.01)
  *G06F 15/16*   (2006.01)

(52) U.S. Cl. .............................. 707/200; 707/1; 707/6; 707/101; 707/203; 707/205; 711/202; 713/1

(58) Field of Classification Search .................. 707/203, 707/200, 1, 6, 101, 206, 205; 711/202, 111; 713/1
See application file for complete search history.

(56) References Cited

U.S. PATENT DOCUMENTS

| | | | |
|---|---|---|---|
| 5,307,494 A | | 4/1994 | Yasumatsu et al. |
| 5,758,352 A | * | 5/1998 | Reynolds et al. ............ 707/200 |
| 5,761,675 A | * | 6/1998 | Isenberg ..................... 707/200 |
| 5,765,169 A | * | 6/1998 | Conner ....................... 707/200 |
| 6,286,013 B1 | * | 9/2001 | Reynolds et al. ............ 707/200 |
| 6,405,325 B1 | | 6/2002 | Lin et al. |
| 6,425,078 B1 | * | 7/2002 | Smith et al. .................... 713/1 |
| 6,604,170 B1 | * | 8/2003 | Suzuki ........................ 711/111 |
| 2004/0111582 A1 | * | 6/2004 | Maeda et al. ............... 711/202 |
| 2004/0205731 A1 | * | 10/2004 | Junkermann ................ 717/136 |
| 2005/0262511 A1 | * | 11/2005 | Taniai et al. ................ 719/310 |

FOREIGN PATENT DOCUMENTS

| | | |
|---|---|---|
| JP | 64-041039 | 2/1989 |
| JP | 06-309207 | 11/1994 |

OTHER PUBLICATIONS

William Boswell, "Inside Windows Server 2003" Apr. 14, 2003, Addison Wesley;p. 830-831.*
"Hardware White Paper, Microsoft Extensible Firmware Initiative FAT32 File System Specification, FAT: General Overview of On-Disk Format", Microsoft Corporation, Version 1.03, pp. 1-34 (2000).

* cited by examiner

*Primary Examiner*—Tony Mahmoudi
*Assistant Examiner*—Dennis Truong
(74) *Attorney, Agent, or Firm*—Harness, Dickey & Pierce, P.L.C.

(57) ABSTRACT

A file management program for managing a file or a directory by means of a long filename of a file system that corresponds to a long filename for retrieval and a short filename of the file system that corresponds to a short filename for retrieval, includes having a computer perform a naming function for naming the short filename including at least one part of file management information in the file system that corresponds to the long filename for retrieval.

12 Claims, 5 Drawing Sheets

| SHORT FILENAME | EXTEN-SION | ATTRI-BUTE | RESERVATION | UPDATE TIME | UPDATE DATE | FIRST CLUSTER NUMBER | FILE SIZE |

| CODE | LONG FILENAME | ATTRI-BUTE | RESER-VATION | CHECK-SUM | LONG FILENAME | FIRST CLUSTER NUMBER | LONG FILENAME |

FIG. 4

FILE MANAGEMENT PROGRAM, DATA STRUCTURE, AND FILE MANAGEMENT DEVICE

BACKGROUND OF THE INVENTION

1. Technical Field

The present invention relates to a file management program, a data structure, and a file management device that can provide a long filename and a short filename for each file or directory and manage the file or directory using the filenames.

2. Related Art

As such a file management program, for example, a file system used for the operating system of Microsoft Corporation (Windows® and MS-DOS), that is, a virtual file allocation table (VFAT) file system is conventionally known. Japanese Unexamined Patent Publication No. Hei 6-309207 is an example of such related art. In the file management program disclosed in the related art example, a long filename and a short filename are provided for each file. The provided long filename is separately stored into a plurality of directory entries, each of which can store a predetermined number of characters. The provided short filename is collectively stored into a single directory entry. Thus the file is managed.

In the file management program as disclosed in the related art example, when a desired file is retrieved, the following flow is generally performed: one directory entry holding the long filename (long filename rectory entry) of an arbitrary file is read out; and the long filename is taken from the directory entry that is read out. If it is decided that the long filename taken from the directory entry continues further, the above flow is repeated starting from reading out the directory entry. In this file management program, when all the characters of the long filename of the arbitrary file are taken by repeating the above flow, the long filename taken from the directory entry is then compared with the filename of the desired file so that the desired file is found out.

In the above conventional file management program, however, if the analysis of a long filename is as necessary as when a desired file is retrieved, the reading and analyzing of the long filename directory entry are repeated. If this program is applied, for example, to an embedded device that has a severe constraint on its hardware performance due to the needs for low power consumption and miniaturization, processing takes much time and thus this program involves the problem of increasing the processing time.

SUMMARY

An advantage of the invention is to provide a file management program, a data structure, and a file management device that enable the improvement of the processing with software (firmware) for which the analysis of a management information on a long filename is necessary.

A file management program according to a first aspect of the invention is the program for managing a file or a directory by means of a long filename of a file system that corresponds to a long filename for retrieval and a short filename of the file system that corresponds to a short filename for retrieval. The program includes having a computer perform a naming function for naming the short filename including at least one part of file management information in the file system that corresponds to the long filename for retrieval.

A file management program according to a second aspect of the invention is the program for managing a file or a directory by means of a long filename of a file system that corresponds to a long filename for retrieval and a short filename of the file system that corresponds to a short filename for retrieval. If file management information in the file system that corresponds to the long filename for retrieval is included in the short filename, the file management program has a computer perform an analysis function that analyzes the file management information in the file system corresponding to the long filename for retrieval by analyzing the short filename.

A data structure according to a third aspect of the invention is the data structure used in a file management program for managing a file or a directory by means of a long filename of a file system that corresponds to a long filename for retrieval and a short filename of the file system that corresponds to a short filename for retrieval. The data structure includes at least one part of file management information in the file system that corresponds to the long file name for retrieval as the short filename.

A file management device according to a fourth aspect of the invention is the device for managing a file or a directory by means of a long filename of a file system that corresponds to a long filename for retrieval and a short filename of the file system that corresponds to a short filename for retrieval. The file management device includes setting the short filename having at least one part of file management information in the file system that corresponds to the long filename for retrieval.

A file management device according to a fifth aspect of the invention is the device for managing a file or a directory by means of a long filename of a file system that corresponds to a long filename for retrieval and a short filename of the file system that corresponds to a short filename for retrieval. If file management information in the file system that corresponds to the long filename for retrieval is included in the short filename, the file management device analyzes the file management information in the file system corresponding to the long filename for retrieval by analyzing the short filename.

According to the first to fifth aspects of the invention, if the processing with the software (firmware) for which analyzing the file management information on the long filename is required, such as the file retrieval processing, is performed, the information required for the processing can be stored in the short filename directory entry. Therefore, the short filename directory entry that includes the management information on the long filename is analyzed before the long filename directory entries are read out and analyzed, enabling the improvement of the processing (such as speeding the retrieval processing) with the software (firmware) for which the analysis of the management information on the long filename is necessary.

It is preferable in the file management program of sixth aspect of the invention that the file management information may be any one of information indicating the total number of characters of the long file name and the number of remaining characters for a file path character string available in the file system that corresponds to the long filename for retrieval.

In this case, for example, when the desired file is retrieved, whether the total number of characters of the long filename of each file matches the total number of characters of the filename of the desired file can be easily decided by sequentially analyzing the short filename of each file. Therefore, only for the directory entry of the file having the matched total number, the processing to analyze the long filename (analysis process) should be performed. The number of performing the analysis process can be reduced in comparison with, for example, the method of performing the analysis process for all the directory entries of all the files. As a result, the processing time required for the file retrieval can be shortened.

Also, for example, when a user specifies a command on the file path, the information on the number of remaining characters for the file path available in the portable terminal can be easily taken from the short filename by analyzing the short filename indicated by the file path. Therefore, the error decision processing, which is the internal processing, can be performed based on the number of remaining characters for the file path. This method can perform the processing more effectively than the method in which the information on the number of remaining characters for the file path available in the portable terminal is taken by repeating the reading and analyzing of the long filename directory entries and analyzing all the characters included in the long filename.

It is preferable that the file management program can have a computer perform a storing function for separately storing the long filename to a plurality of directory entries, each of which can store a predetermined number of characters, wherein the naming function sets the short filename including information indicating the number of the directory entries necessary for storing all characters of the long filename.

In this case, for example, when the long filename of a predetermined file is read out, the information on the number of characters of the directory entries in which the long filename of the predetermined file can be taken by analyzing the short filename of the predetermined file. The reading from the directory entries in which the information is stored can be performed at a time. This method can shorten the time required for reading out the long filename in comparison with, for example, the method in which all characters included in the long filename is read out by repeating the reading and analyzing of the long filename directory entry as many times as the number of the long filename directory entries.

It is also preferable in the file management program that the naming function have a character indicating a serial number further included in the short filename, and the number of characters included may be changed in accordance with the number required for the serial number.

In this case, for example, if there are many files to which serial numbers are attached, more serial numbers can be used by increasing the number of characters indicating serial numbers.

It is preferable that the file management program have the computer perform a checksum setting function by which when the short filename is set, the checksum corresponding to the set short filename is set in accordance with standards of the file system that corresponds to the long filename for retrieval.

In this case, for example, if the short filename of the file generated by the file system that corresponds to the long filename is set again by this file management program, the checksum corresponding to the short filename that is set again is also set again in accordance with the standards of the file system that corresponds to the long filename. Therefore, unlike the method in which the checksum is not set again and remains the same as before even though the short filename is set again, for example, when the file that has been set again is handled by the file system that corresponds to the long filename, the checksum is never erroneously judged to be not adequate, and as a result, enabling the compatibility with other file systems that correspond to the long filename.

BRIEF DESCRIPTION OF THE DRAWINGS

The invention will be described with reference to the accompanying drawings, wherein like numbers refer to like elements, and wherein:

FIG. 4 is an explanatory view illustrating the operations of the personal digital terminal.

DESCRIPTION OF THE EMBODIMENT

An instance of applying a file management program to a personal digital terminal with an imaging unit such as a charge-coupled device (CCD) camera that can generate image data will now be described as an exemplary embodiment of the invention.

In this portable terminal 1, when image data is generated by an imaging unit, a short filename directory entry that has a short filename, including information helpful in the retrieval by a long filename, set in a filename field and field values (information) in accordance with the standards of FAT file system set in other fields, and long filename directory entries in accordance with the standards of VFAT file system are set for the file of the generated image data, and the file is recorded into a memory card. The portable terminal 1 enables a user to handle the file recorded in the memory card with a personal computer that uses the FAT file system but neither uses VFAT file system nor has the VFAT feature. When a request to retrieve such a file by a long filename is made by the portable terminal, in the portable terminal 1, an arbitrary file can be effectively retrieved from the memory card by analyzing the short filename.

<Structure of the Personal Digital Terminal>

Figure 1:
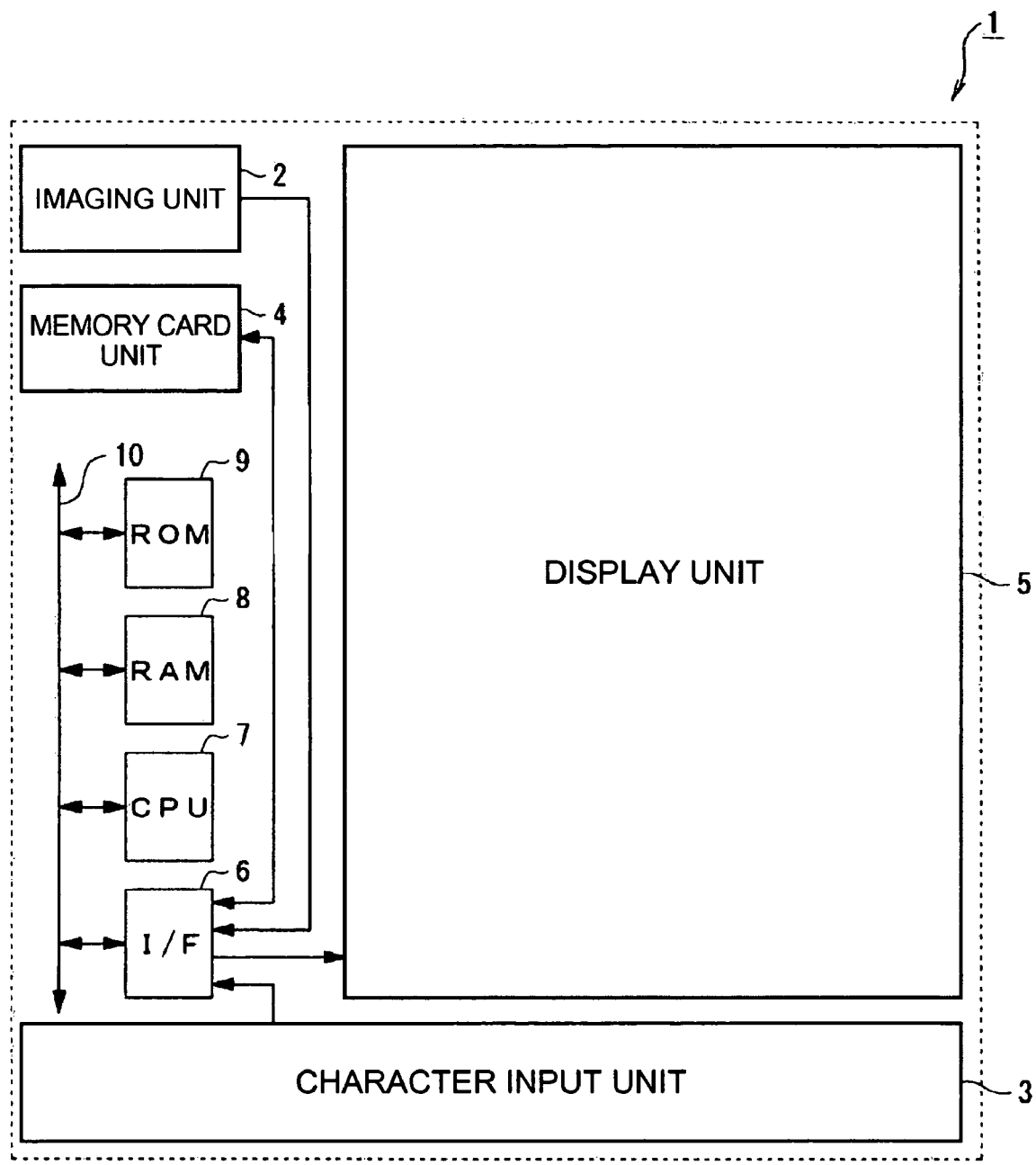
FIG. 1 is a block diagram illustrating the internal structure of a personal digital terminal in an exemplary embodiment.

FIG. 1 is a block diagram illustrating the internal structure of the personal digital terminal in the exemplary embodiment. As shown in FIG. 1, the portable terminal 1 includes an imaging unit 2, a character input unit 3, a memory card unit 4, a display unit 5, an interface (I/F) 6, a central processing unit (CPU) 7, a random access memory (RAM) 8, and a read only memory (ROM) 9. In the portable terminal 1, all the units except the imaging unit 2, character input unit 3, memory card unit 4, and display unit 5, are mutually connected through buses 10.

The imaging unit 2 is arranged in the upper part of the top view on the backside and includes a CCD camera (not shown.) When a predetermined operation is carried out, the imaging unit 2 generates image data of the subject by a CCD camera (not shown) and outputs the image data to the CPU 7 via the I/F 6.

The character input unit 3 is arranged in the lower part of the top view on the front side and includes a keyboard (not shown) from which arbitrary character strings can be entered. The character input unit 3 outputs the information about the character strings entered from the keyboard (not shown) via the I/F 6.

Furthermore, the memory card unit 4 is arranged in the left end of the top view and structured such that a nonvolatile memory card (not shown) in which if the power supply stops, data can be kept is removably attached to the memory card unit 4. When a file store command (described below) is output from the CPU 7, the memory card unit 4 stores a file generated in the CPU 7 (described below) to the memory card (not shown).

When a short directory entry store command (described below) is output from the CPU 7, the memory card unit 4 also stores all the information that is to be stored to the short filename directory entry generated in the CPU 7 as described below to the short filename directory entry (memory card (not shown)). When a long directory entry store command (described below) is output form the CPU 7, the memory card unit 4 further stores all the information that is to be stored to the long filename directory entries generated in the CPU 7 as described below to the long filename directory entries (memory card (not shown)).

When a short directory entry read command (described below) is output from the CPU 7, the memory card unit 4 reads out the short filename directory entry of the file specified by the short directory entry read command (described below) from the memory card (not shown), and outputs it to the CPU 7 via the I/F 6. When a long directory entry read command (described below) is output from the CPU 7, the memory card unit 4 reads out a long filename directory entry corresponding to the directory entry read out by the short directory entry read command (described below) by the number specified with a variable [l] at a time from the memory card (not shown), and outputs it to the CPU 7 via the I/F 6.

When a file read command (described below) is output from the CPU 7 via the I/F 6, the memory card unit 4 reads out a file corresponding to the directory entry read out with the short directory entry read command (described below) from the memory card (not shown), and outputs it to the display unit 5 via the I/F 6.

The display unit 5 is arranged in the center of the top view on the front side, and structured to include a display device (not shown) on which an arbitrary image can be displayed. When the file is output from the memory card unit 4 via the I/F 6, the display unit 5 displays data contained in the output file (such as image data and document data) on the display device (not shown).

The I/F 6 converts the data sent and received among units 2 to 5, and between each of units 2 to 5 and the CPU 7, either units 2 to 5 or the CPU 7 being included in the portable terminal 1, into the format readable to the receiver, each of the units 2 to 5 or the CPU 7.

The CPU 7 reads out various types of programs such as a basic control program (operating system: OS) and application programs that are stored in the ROM 9, and performs them to control units 2 to 9 included in the portable terminal 1.

When image data is output from the imaging unit 2, the CPU 7 generates a file of the output image data. When the information about the character string is input as the file path of the generated file (also referred to as "new generated file" hereinafter) from the character input unit 3, the CPU 7 also outputs a command of storing the new generated file to the directory at the recording position specified with the above file path of the memory card (not shown)(also referred to as "file store command" hereinafter) to the memory card unit 4 via the I/F 6. When the information about the character string is input from the character input unit 3 as the filename of the new generated file to be stored, the CPU 7 performs the directory entry generation process (described below). Then, when the directory entry generation process (described below) is performed, the CPU 7 generates a short filename indicating information helpful in the retrieval of a long filename and other information in accordance with the standards of the VFAT file system and the standards of the FAT file system based on the information about the input character string. After outputting a command of storing the generated short filename and other information to the short filename directory entry and the long filename directory entries of the above file (memory card (not shown)) (short directory entry store command (described below) and long directory entry store command (described below)) to the memory card unit 4 via the I/F 6, the CPU 7 ends the directory entry generation process (described below).

Specifically, the short filename consists of 8 characters, [s], [l], [nn], [mm], "~(tilde)", and "k" (in this case, "s", "n", "m", and "k" being variables, and "~" being a fixed character). One character at the head of the long filename is set for the variable [s].

The result of adding "1" to the quotient obtained by dividing a filename for directory entry generation by 13 characters (the number employed by the standards of VFAT file system as the maximum number of characters that can be stored to a single long filename directory entry), that is, the required number (existing number) of the long filename directory entries is set for the variable [l].

The total number of characters in hexadecimal form is set for the variable [nn].

The number of remaining characters in hexadecimal form for the file path that can be used by the standards of VFAT file system is also set for the variable [mm]. Specifically, if the new generated file is stored to the root directory, the value in hexadecimal form that is obtained by subtracting the number of characters used to specify a drive (for example, "3" in the case "C:\") and the variable [nn] from 255 (the maximum number of characters of the file path that can be used under the standards of VFAT file system) is set. If the new generated file is stored to a lower directory than the root directory, the value obtained by subtracting the variable [nn] from the valuable [mm] of the directory to which the file is stored is set.

Furthermore, a serial number in hexadecimal form to identify each of short filenames having the six equal characters from first to sixth, that is, having equal variables of [s], [l], [nn], and [mm] is set for the variable [k].

In order to retrieve a desired file among a plurality of files recorded in the memory card (not shown), when information about the character string is input as the filename of the desired file from the character input unit 3, the CPU 7 carries out the file retrieval process. (described below). Then, when the file retrieval process (described below) is carried out, the CPU 7 outputs a short directory entry read command (described below) to the memory card unit 4 via the I/F 6 to sequentially read out the short filename directory entry of the file from the memory card (not shown). The CPU 7 also decides based on the variables [l] and [nn] of the short filename recorded in the read directory entry whether the possibility that the long filename matches the input character string is high. If the possibility is high, the CPU 7 outputs a long directory entry read command (described below) to the memory card unit 4 to read out the long filename and the extension recorded in the read long filename directory entry at a time from the memory card (not shown). The CPU 7 further decides whether the read long filename and extension completely match the information of the character string. If they match completely, the CPU 7 outputs a file read command (described below) to the memory card unit 4 to display the read file on the display unit 5, and then ends this file retrieval process (described below).

A RAM 8 creates a work area for developing various types of programs to be executed by the CPU 7 and a memory area for storing data to be used in executing various types of programs. When a read request is output from the CPU 7, the RAM 8 outputs the data in response to the read request from the data stored in the RAM 3.

Various types of programs to be executed by the CPU 7 and data are stored in a ROM 9. When a read request is output from the CPU 7, the ROM 9 outputs the program, etc., in response to the read request from the program and data stored in the ROM 9.

<Operations of the Personal Digital Terminal>

The directory entry generation process performed in the CPU 7 will now be described in accordance with the flow chart in FIG. 2. The directory entry generation process is a process that is performed when information about a character string is input as the filename of a new generated file from the character input unit 3. Initially, in step S101 of the process, it is decided whether or not the input character string, that is, the filename (also referred to as "filename for directory entry generation" hereinafter) has more than 8 characters, or the extension has more than 3 characters. Then, if the filename for directory entry generation has more than 8 characters or the extension has more than 3 characters (Yes), the process proceeds to step S102, while if the filename for directory entry generation has 8 or less characters and the extension has 3 or less characters (No), the process proceeds to step S109.

In step S102, the filename for directory entry generation is set as a long filename, and the variables [s], [l], [nn], and [mm] are determined according to the method described above, so that short filename [s] [l] [nn] [mm] "~" "kk" is generated.

When the process then proceeds to step S103, other field values (information (information except the short filename)) to be stored in the short filename directory entry of the new generated file are generated in accordance with the standards of FAT file system.

Proceeding to step S104, the process outputs a command to store the short filename generated in step S102 and other information generated in step S103, that is, all the information to be stored in the short filename directory entry, in the short filename directory entry of the new generated file (also referred to as "short directory entry store command" hereinafter) to the memory card unit 4 via the I/F 6.

Proceeding to step S105, the process sets the filename for directory entry generation as it is as a long filename.

Proceeding to step S106, the process computes the checksum of the short filename generated in accordance with the conversion (naming) rule of the exemplary embodiment of the invention in step S103, according to the standards of VFAT file system.

Proceeding to step S107, the process generates other field values to be stored in the long filename directory entries of the new generated file (information (information except the long filename and checksum)) in accordance with the standards of VFAT file system.

Proceeding to step S108, the process outputs a command to store the long filename set in step S105, the checksum generated in step S106, and other information generated in step S107, that is, all the information to be stored in the long filename directory entries, in the long filename directory entries of the new generated file (also referred to as "long directory entry store command" hereinafter) to the memory card unit 4 via the I/F 6, and ends this arithmetic process.

On the other hand, in step S109, the process generates all the information to be stored in the short filename directory entry of the new generated file, according to the standards of FAT file system.

Proceeding to step S110, the process outputs the short directory entry store command to store all the information generated in step S109 in the short filename directory entry of the new generated file to the memory card unit 4 via the I/F 6, and then ends this arithmetic process.

Figure 3:
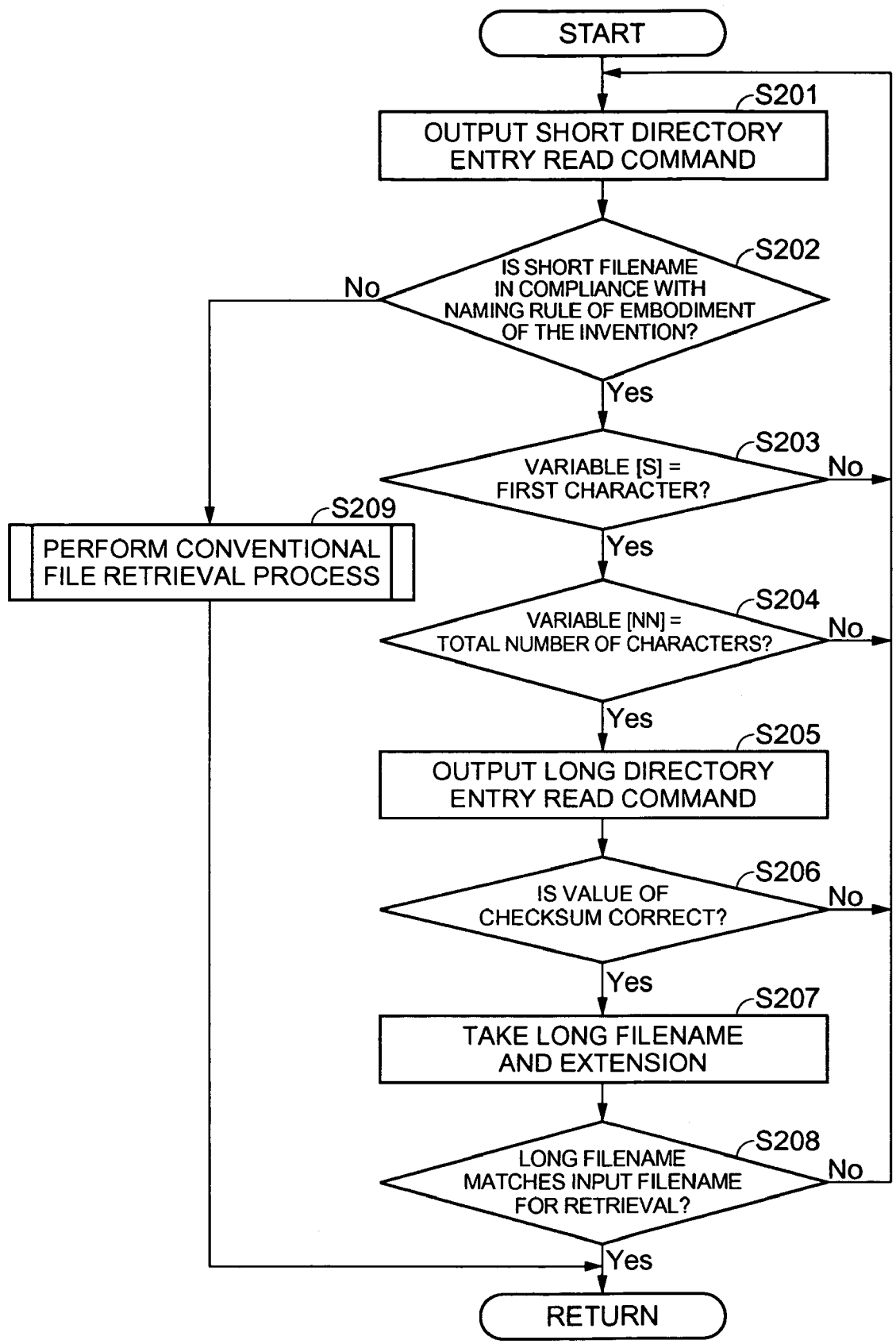
FIG. 3 is a flow chart illustrating the file search process.

The file retrieval process performed in the CPU 7 will now be described in accordance with the flow chart in FIG. 3. In order to retrieve a desired file from a plurality of files recorded in an arbitrary directory of the memory card (not shown), when information about the character string is input as the filename of the desired file, that is, the file path of the directory in which the file to be retrieved is stored from the character input unit 3, the file retrieval process is performed in the CPU 7. First, in step S201 of the process, the process outputs a command to read out a short filename directory entry sequentially from the head of recoding positions of the directory entry group corresponding to the file path specified by a user and output it to the CPU 7 (also referred to as "short directory entry read command" hereinafter) to the memory card unit 4 via the I/F 6.

Then, proceeding to step S202, the process decides whether the short filename included in the directory entry read in step S201 is set in accordance with the naming rule of the invention. Specifically, the process decides whether all the variables [s] [l] [mm] and "k" of the short filename are values within the valid range as parameter values of the naming rule of the exemplary embodiment of the invention. If all the variables are decided to be valid (Yes), the process proceeds to step S203, while if any one of them is decided to be not valid (No), the process proceeds to step S209.

In step S203, the process decides whether the variable [s] of the short filename included in the directory entry read in step S201 matches the first character of the filename input by a user (also referred to as "filename for retrieval"). If these characters match (Yes), the process proceeds to step S204, while if they do not match (No), the process proceeds to step S201.

In step S204, the process decides whether the variable [nn] of the short filename included in the directory entry read in step S201 matches the total number of characters in hexadecimal form of the filename for retrieval. Then, if they match (Yes), the process proceeds to step S205, while if they do not match (No), the process proceeds to step S201 so as to read out and analyze the (short filename) directory entry at the next recording position.

In step S205, the process takes the variable [l] of the short filename from the directory entry read in step S201, and outputs a command of reading out the long filename directory entries by the number specified with the variable [l] at a time from the memory card (not shown) and outputting them to the CPU 2 (also referred to as "long directory entry read command" hereinafter) to the memory card unit 4 via the I/F 6.

Proceeding to step S206, the process computes the checksum of the short filename included in the directory entry read in step S201 in accordance with the standards of VFAT file system, that is, the computational expression that is similar to that in step S106 of the directory entry generation process. Then, whether each calculated checksum matches each checksum included in the long filename directory entries read in step S205 is decided. If all of them match (Yes), the process proceeds to step S207, while if they do not match, that is, if a unique file system specification that is not in accordance with the standards of VFAT file system is possibly used (No), the process proceeds to step S201.

In step S207, the process takes the long filename and extension from the directory entries read in step S205.

Proceeding to step S208, the process decides whether the long filename taken in step S207 and the filename for retrieval match. Then, if they match (Yes), the process outputs a command of reading out a file corresponding to the directory entry read in step S201 from the memory card (not shown) and outputting it to the display unit 5 (also referred to as "file read command" hereinafter) to the memory card unit 4 via the I/F 6, and then ends this arithmetic process. If they do not match (No), the process proceeds to step S201, and analysis process of the directory entry is repeated starting from step S201.

On the other hand, in step S209, the conventional file retrieval process of retrieving a file for which the short filename and the filename for retrieval match according to the standards of FAT file system is performed. At the moment when retrieval of the desired file is achieved, this arithmetic process ends. At this point, in the product system that requires compatibility with VFAT file systems other than the VFAT file system according to the exemplary embodiment of the invention, the compatibility may be maintained by additionally performing the analysis process of the conventional VFAT file system, which has been in use before the present invention.

<Specific Operations of Personal Digital Terminal>

Operations of the portable terminal 1 of the exemplary embodiment will be described in detail based on the specific situations.

<File Generation>

It is assumed that a user carries out a predetermined operation for imaging, and image data of the subject is generated by a CCD camera (not shown) of the imaging unit 2. Then, as shown in FIG. 2, the generated image data is output by the imaging unit 2 to the CPU 7 via the I/F 6. A file of the image data that is output from the CPU 7 is generated by the CPU 7.

Next, it is assumed that the user enters a character string "A: \ABCDEFGHIJ.BMP" as a combination of the filename (filename for directory entry generation) and extension of the generated file (new generated file) from a keyboard (not shown) of the character input unit 3. The information on the entered character string is output to the CPU 7 via the I/F 6 by the character input unit 3. A file store command is output to the memory card unit 4 via the I/F 6 by the CPU 7. Receiving the command, the memory card unit 4 records the generated file to the data record area corresponding to the entered file path (in the above example, "A:\"). At the same time, the directory entry generation process is performed by the CPU 7. As shown in FIG. 2, the decision of step S101 is "Yes", and the short filename "A10EEE~1" of the new generated file is generated based on the input filename (filename for directory entry generation) in step S102 (in this case, "A" being set for [s], "1" for [l], "0E(14)" for [nn], "EE (255−3−14=238)" for [mm], and "1" for [kk]).

Furthermore, in step S103, other information to be stored in the short filename directory entry of the new generated file is generated in accordance with the standards of FAT file system. In step S104, the short directory entry store command is output to the memory card unit 4 via the I/F 6. As shown in FIG. 4, the short filename and other field values (information) that are generated in the CPU 7 are stored to the short filename directory entry of the memory card (not shown) by the memory card unit 4.

Figure 2:
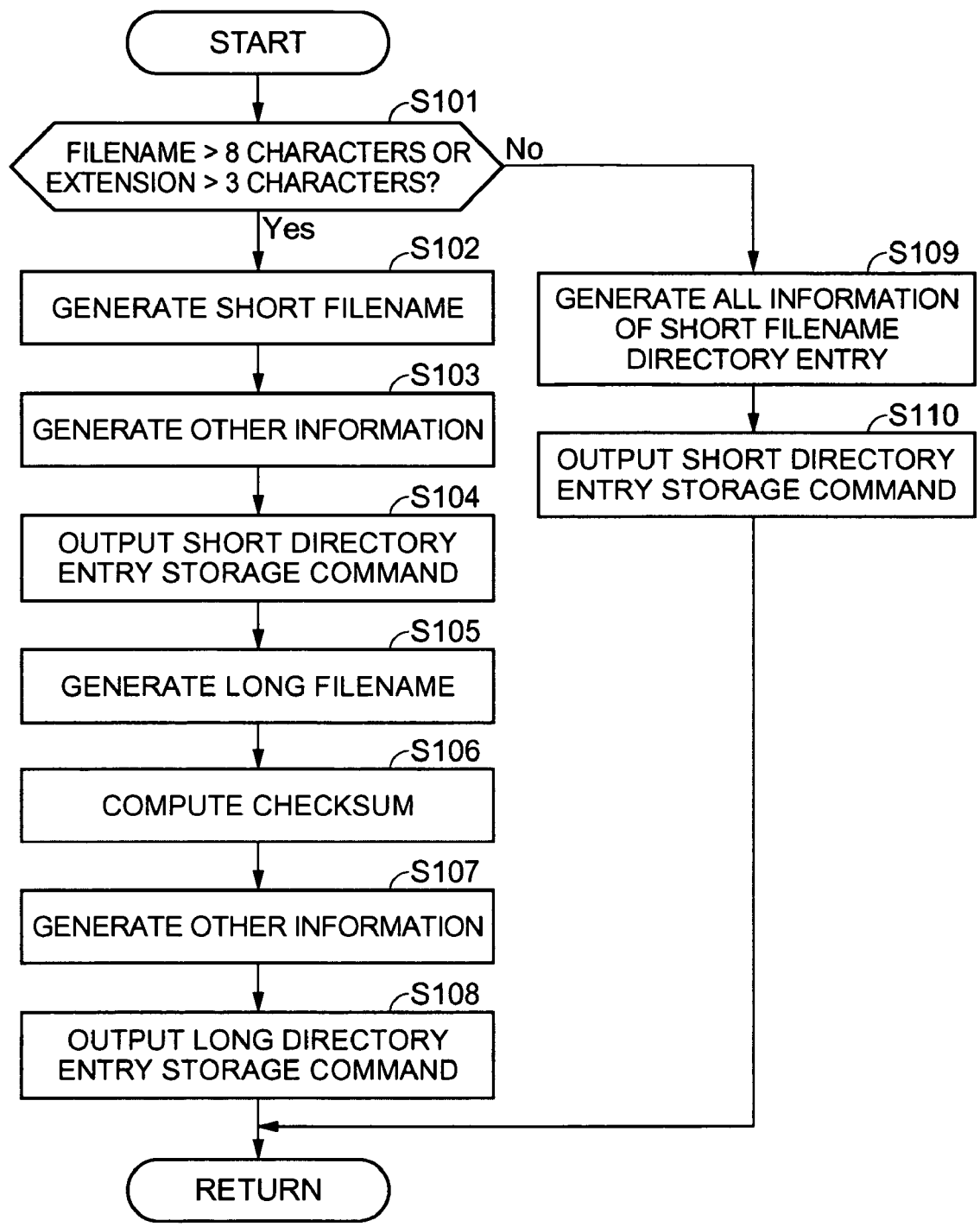
FIG. 2 is a flow chart illustrating the directory entry generation process.

Also as shown in FIG. 2, in step S105, as the long filename, the whole character string of the filename for directory entry generation "ABCDEFGHIJ.BMP" s set as it is; in step S106, the checksum of the short filename is computed in accordance with the standards of VFAT file system. In step S107, other field values (information) to be stored in the long filename directory entries of the new generated file are generated in accordance with the standards of VFAT file system. In step S108, a long directory entry store command is output to the memory card unit 4 via the I/F 6. The long filename, checksum, and other information generated in the CPU 7 are stored in the long filename directory entries of the memory card (not shown) by the memory card unit (not shown) as shown in FIG. 4, and then this arithmetic process ends.

<File Retrieval>

After the above flow is repeated and a plurality of files are recorded in the memory card (not shown), it is assumed that, in order to retrieve a desired file among the plurality of files, a combination of the filename (filename for retrieval) and extension of the desired file, that is, information on the character string is input from the character input unit 3 as a file path of the directory in which the file to be retrieved is stored. Then the file retrieval process is performed by the CPU 7. As shown in FIG. 3, in step S201, the short directory entry read command is output to the memory card unit 4 via the I/F 6. The memory card unit 4 reads out the short filename directory entry at the head of recording positions of the directory entry group corresponding to the file path specified by a user from the memory card (not shown) and outputs it to the CPU 7, as shown in FIG. 4, and the decision in step S202 is also "Yes", as shown in FIG. 3. If the variable [s] of the short filename included in the read directory entry matches the first character of the filename for retrieval, the decision in step S203 is "Yes". If the variable in [nn] of the short filename does not match the total number of characters in hexadecimal form of the filename for retrieval, the decision in step S204 is "No". The above flow is repeated starting from step S201, and the short filename directory entries subsequent to the short filename directory entry at the head recording position are sequentially read out.

If the variable [nn] of the short filename matches the total number of characters in hexadecimal form of the filename for retrieval while the above flow is repeated, it is decided that the possibility of matching between the filename of the file to be retrieved and the long filename is high, and the decision in step S204 is "Yes". In step S205, the long directory entry read command is output to the memory card unit 4 via the I/F 6. Then, the variable [l] of the short filename is taken by the memory card unit 4, and long filename directory entries are read out by the number specified with the variable [l] (in the above case, 1) at a time from the memory card (not shown) and output to the CPU2.

In step S206, the checksum of the short filename included in the read directory entry is computed according to the computational expression similar to that in step S106 of the directory entry generation process. If the computed checksum matches each checksum included in each long filename directory entry, the decision in step S206 is "Yes". In step S207, the long filename and extension are taken from the read directory entry, and if the long filename taken matches the filename for retrieval, the decision in step S208 is "Yes". The process outputs a file read command to the memory card unit 4 via the I/F 6, and then ends this arithmetic process. The file corresponding to the read directory entry is read out from the memory card (not shown) and output to the display unit 5 by the memory card unit 4, and the image data included in the output file is displayed in the display device (not shown).

Thus, according to the portable terminal 1 of the exemplary embodiment, the naming rule of converting the long filename into the short filename such that the value of the variable [nn] indicating the total number of characters of the long filename is included in the short filename is employed. Consequently, when the file desired by a user is retrieved, whether the total number of characters of the long filename matches the total number of characters of the filename of the desired file can be easily decided by analyzing only the short filename stored in the short filename directory entry. Therefore, only for the directory entry of the file having the matched total number, the analysis process of analyzing the long filename should be performed. The number of performing the analysis process can be reduced in comparison with, for example, the method of performing the analysis process for all the directory entries of all the files. As a result, the processing time required for the retrieval of the desired file can be shortened.

The naming rule of converting the long filename into the short filename such that the value of the variable [l] indicating recording number of the long filename directory entries is included in the short filename is employed. Consequently, when the long filename is read out, information on the number of directory entries in which the long filenames are stored can be taken by analyzing the short filename. Therefore, the long filename directory entries can be read out at a time. As a result, the time required for reading out the long filename can be reduced in comparison with, for example, the method of reading out all the characters included in the long filename while repeating the reading and analyzing of the long filename directory entry.

Figure 5:
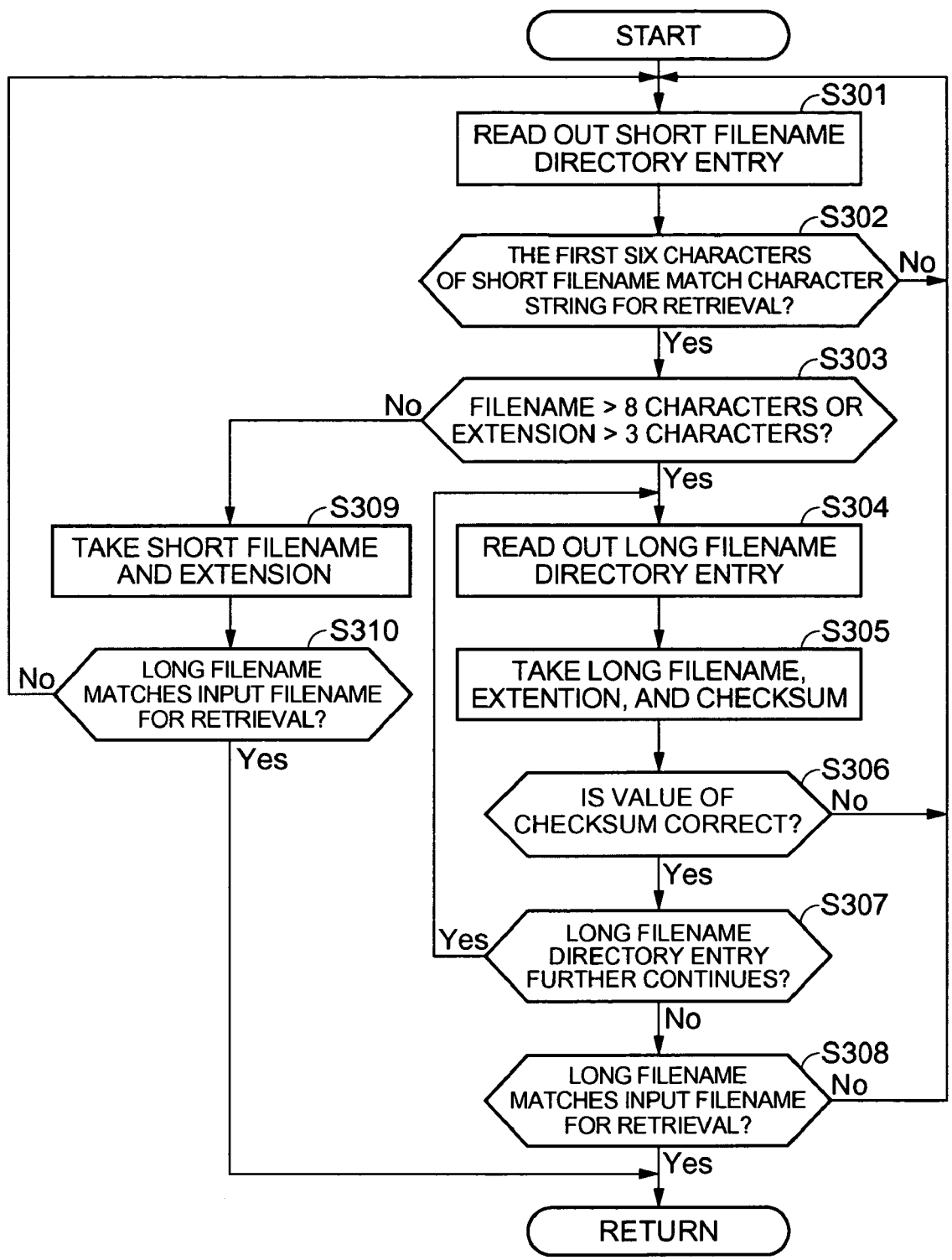
FIG. 5 is a flow chart illustrating the conventional file search process.

Additionally, in the conventional method, the short filename directory entries sequentially from the head of recoding positions of the directory entry group corresponding to the file path specified by a user are read out (S301), the long filename, etc., are taken from the read directory entries (S304), and if the read long filename is decided to continue further (S307 "Yes"), the above flow is repeated starting from reading out the directory entry (S301 to S307), as shown in FIG. 5. In the conventional method, if all the characters of the long filename are taken by repeatedly performing the above flow (S307 "No"), the long filename having characters all of which are taken is compared with the filename of the desired file (S309), and therefore the desired file is found out. If this method is applied, for example, to an embedded device that has a severe constraint on its hardware performance, the method involves the problem of taking much time for retrieval process of the desired file.

Information other than short filename (such as checksum) according to the conversion (naming) rule of the exemplary embodiment of the invention is set in accordance with the standards of FAT file system. Even a personal computer that uses the FAT file system, but neither uses VFAT file system nor has the VFAT feature can therefore recognize that the file is normal. As a result, a user can handle the file with such a personal computer. For the file that is generated by the portable terminal 1 and has the short filename converted to one in accordance with the standards of VFAT file system by being operated with a personal computer using the VFAT file system, processes such as rewriting the short filename by the portable terminal 1 may be performed.

Furthermore, the checksum corresponding to the short filename generated in accordance with the conversion (naming) rule of the exemplary embodiment of the invention is set to the directory entries in accordance with the standards of VFAT file system. For example, if the short filename of the file generated by the device using the VFAT file system other than the portable terminal 1 is set again by this file management program, the checksum corresponding to the filename is also set again in accordance with the standards of VFAT file system. Therefore, unlike the method in which the checksum is not set again even though the short filename is set again, for example, when the file that has been set again is handled by the device using the VFAT file system other than the portable terminal 1, the checksum is never erroneously judged to be not adequate, enabling the compatibility with other VFAT file systems.

As described above, in the exemplary embodiment, steps S102 and S104 in FIG. 2 constitutes a naming function disclosed in claims. Similarly, step S108 in FIG. 2 constitutes a storing function; steps S106 and S108 constitute a checksum setting function; steps S202, S203, and S204 constitute an analysis function; the CPU 7 in FIG. 1 and step S104 in FIG. 2 constitute setting; and the CPU 7 in FIG. 1 and steps S202, S203, and S204 in FIG. 3 constitute an analysis function.

A file management program, a data structure, and a file management device of the invention are not limited to the contents of the above exemplary embodiment, and may be suitably modified without departing from the scope of the invention.

While an instance of including the values of the variable indicating the total number of characters of the long filename [nn], variable indicating the number of directory entries necessary for storing all the characters of the long filename [l], and number of remaining characters in hexadecimal form for the file path available for the standards of VFAT file system [mm] in the short filename has been given, embodiments are not limited to this. For example, other information that is beneficial as much as possible to the internal processing of firmware for an embedded device implementing a file management program, and implementation codes may be included in the short filename.

While an instance of expressing the serial number in hexadecimal form to identify each of those that have the same value of variable [s] in the variable of 1 character (1 bit) [k] has been given, embodiments are not limited to this. For example, if importance is given to the number of recording (identifying) a serial number, the width of the bit field of the variable [k] may be doubled, so that the serial numbers up to "255" are available.

Furthermore, while an instance of including the value of the variable [s] that indicates the first one character of the long filename and the fixed character [~] in the short filename has been given, embodiments are not limited to this. For example, if the compatibility with a personal computer using the VFAT file system need not be considered, other information on all the characters of the long filename instead of the value of the variable [s] and the fixed character [~] may be included in the short filename. Namely, the short filename may be flexibly expanded in accordance with the specification of the product in which the VFAT file system is implemented.

What is claimed is:

1. A file management program stored in a computer-readable medium for managing a file or a directory by means of a long filename of a file system that corresponds to a long filename for retrieval and a short filename of the file system that corresponds to a short filename for retrieval, the file management program comprising:

having a computer perform a naming function for naming the short filename including at least one part of file management information in the file system that corresponds to the long filename for retrieval;

the short filename including a first character corresponding to a character at a head of the long filename, a second character corresponding to a number of directory entries required for storing all characters of the long filename, a third character and a fourth character, the third character and the fourth character corresponding to a total number of characters of the long filename in hexadecimal form, a fifth and a sixth character, the fifth and the sixth character corresponding to a number of remaining characters for a file path for the file or the directory in hexadecimal form, and a seventh character corresponding to a serial number for the short filename having other equal characters in hexadecimal form.

2. The file management program according to claim 1, wherein the file management information includes is any one of information indicating a total number of characters of the long file name and a number of remaining characters for a file path character string available in the file system that corresponds to the long filename for retrieval.

3. The file management program according to claim 1 further comprising:
having a computer perform a storing function for separately storing the long filename to a plurality of directory entries, each of which can store a certain number of characters.

4. The file management program according to claim 1, wherein the naming function has a character indicating a serial number further included in the short filename, and a number of characters included is changed in accordance with a number required for the serial number.

5. The file management program according to claim 1 further comprising:
having the computer perform a checksum setting function by which when the short filename is set, a checksum corresponding to the short filename that is set is set in accordance with standards of the file system that corresponds to the long filename for retrieval.

6. A file management program stored in a computer-readable medium for managing a file or a directory by means of a long filename of a file system that corresponds to a long filename for retrieval and a short filename of the file system that corresponds to a short filename for retrieval, the file management program comprising:
having a computer perform an analysis function that analyzes the file management information in the file system corresponding to the long filename for retrieval by analyzing the short filename, if file management information in the file system that corresponds to the long filename for retrieval is included in the short filename;
the short filename including a first character corresponding to a character at a head of the long filename, a second character corresponding to a number of directory entries required for storing all characters of the long filename, a third character and a fourth character, the third character and the fourth character corresponding to a total number of characters of the long filename in hexadecimal form, a fifth and a sixth character, the fifth and the sixth character corresponding to a number of remaining characters for a file path for the file or the directory in hexadecimal form, and a seventh character corresponding to a serial number for the short filename having other equal characters in hexadecimal form.

7. A data structure used in a file management program stored in a computer-readable medium for managing a file or a directory by means of a long filename of a file system that corresponds to a long filename for retrieval and a short filename of the file system that corresponds to a short filename for retrieval, the data structure comprising:
at least one part of file management information in the file system that corresponds to the long file name for retrieval as the short filename;
the short filename including a first character corresponding to a character at a head of the long filename, a second character corresponding to a number of directory entries required for storing all characters of the long filename, a third character and a fourth character, the third character and the fourth character corresponding to a total number of characters of the long filename in hexadecimal form, a fifth and a sixth character, the fifth and the sixth character corresponding to a number of remaining characters for a file path for the file or the directory in hexadecimal form, and a seventh character corresponding to a serial number for the short filename having other equal characters in hexadecimal form.

8. A file management device including a program stored in a computer-readable medium for managing a file or a directory by means of a long filename of a file system that corresponds to a long filename for retrieval and a short filename of the file system that corresponds to a short filename for retrieval, the file management device comprising:
a setting unit for setting the short filename including at least one part of file management information in the file system that corresponds to the long filename for retrieval;
the short filename including a first character corresponding to a character at a head of the long filename, a second character corresponding to a number of directory entries required for storing all characters of the long filename, a third character and a fourth character, the third character and the fourth character corresponding to a total number of characters of the long filename in hexadecimal form, a fifth and a sixth character, the fifth and the sixth character corresponding to a number of remaining characters for a file path for the file or the directory in hexadecimal form, and a seventh character corresponding to a serial number for the short filename having other equal characters in hexadecimal form.

9. A file management device including a program stored in a computer-readable medium for managing a file or a directory by means of a long filename of a file system that corresponds to a long filename for retrieval and a short filename of the file system that corresponds to a short filename for retrieval, the file management device comprising:
a analyzing unit for analyzing the file management information in the file system corresponding to the long filename for retrieval by analyzing the short filename, if file management information in the file system that corresponds to the long filename for retrieval is included in the short filename;
the short filename including a first character corresponding to a character at a head of the long filename, a second character corresponding to a number of directory entries required for storing all characters of the long filename, a third character and a fourth character, the third character and the fourth character corresponding to a total number of characters of the long filename in hexadecimal form, a fifth and a sixth character, the fifth and the sixth character corresponding to a number of remaining characters for a file path for the file or the directory in hexadecimal form, and a seventh character corresponding to a serial number for the short filename having other equal characters in hexadecimal form.

10. The file management program according to claim 1, further comprising having the computer determine whether the file or the directory has been named with the first through seventh characters when retrieving the file or the directory.

11. The file management program according to claim 1, the short filename including a fifth and a sixth character, the fifth and the sixth character corresponding to a number of remaining characters for a file path for the file or the directory in hexadecimal form.

12. The file management program according to claim 1, the short filename including a fifth character corresponding to a serial number for the short filename having other equal characters in hexadecimal form.

* * * * *